March 2, 1971     M. POUCHER ET AL     3,566,493
METHOD OF MAKING AN AEROFOIL-SHAPED BLADE FOR A
FLUID FLOW MACHINE
Filed April 2, 1968
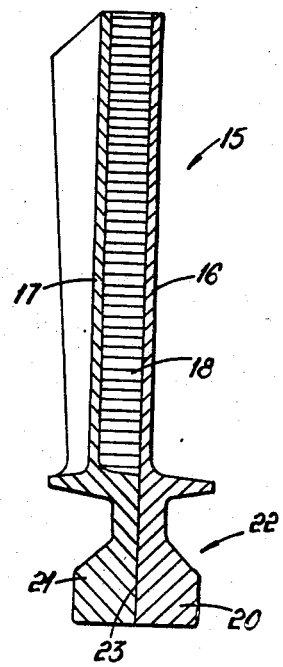
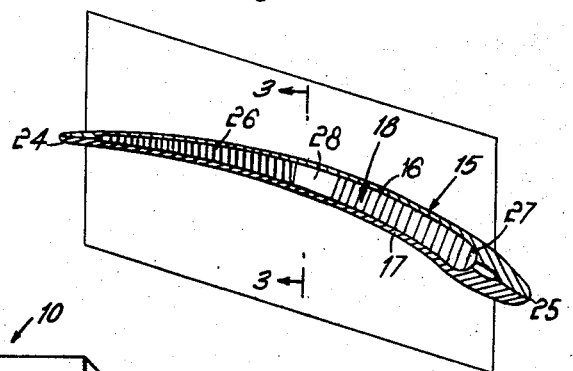
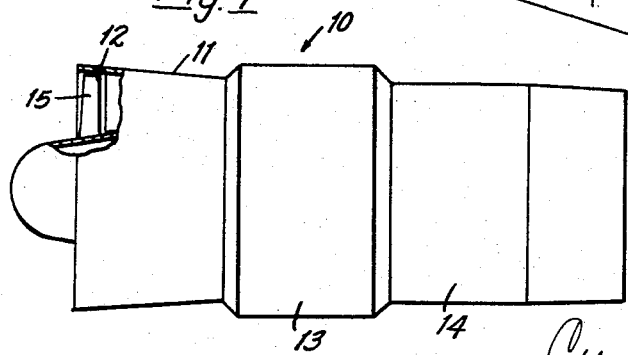

United States Patent Office 3,566,493
Patented Mar. 2, 1971

3,566,493
METHOD OF MAKING AN AEROFOIL-SHAPED BLADE FOR A FLUID FLOW MACHINE
Michael Poucher and James A. Petrie, Derby, England, assignors to Rolls-Royce Limited, Derby, England
Filed Apr. 2, 1968, Ser. No. 718,125
Claims priority, application Great Britain, May 5, 1967, 21,077/67
Int. Cl. B23p 15/02, 15/04
U.S. Cl. 29—156.8         19 Claims

ABSTRACT OF THE DISCLOSURE

A method of making a gas turbine engine blade comprises forming the blade of two wall members which are bonded to each other and to honeycomb structure disposed between the wall members. Different portions of the honeycomb structure may have different densities.

---

This invention concerns a method of making an aerofoil-shaped blade for a fluid flow machine, such, for example, as a gas turbine engine, and also concerns a blade made by said method.

The term "blade" as used in this specification is intended to include both large fan blades, for which the present invention is particularly suitable, and also blade-like members such as inlet guide vanes, nozzle guide vanes, and aerofoil-shaped struts extending across the fluid duct of a gas turbine engine.

According to the present invention, there is provided a method of making an aerofoil-shaped blade for a fluid flow machine comprising forming the blade of two separate wall members, forming a multicellular honeycomb structure with different portions having different densities, and bonding said wall members to each other and to the honeycomb structure disposed between the wall members.

The term "bonded" as used in this specification is intended to include both the use of a bonding agent and also welding.

The honeycomb structure and wall members may be made of the same or of a different metal or alloy. Alternatively, the honeycomb structure may be made of fibre-reinforced synthetic resin material.

The said wall members may be sheet metal members or may be forgings which have been hot pressed to give them the desired camber and stagger.

Each wall member may be welded or otherwise bonded to a part of a root portion of the blade, and the said parts of the said root portion may thereafter be bonded to each other.

The surface of the said root portion may be curved to follow the blade profile.

Prior to the parts of the said root portion being bonded to each other, the said parts and the wall members bonded thereto may be etched and electro-chemically machined at the surfaces which are to be bonded.

The said portions of the honeycomb structure may be portions of a single integral structure and may have been stretched in a non-uniform manner.

Alternatively, the said portions of the honeycomb structure may be separate from each other and may, for example, be of different gauge material and/or of different cell size.

Preferably the portion of the honeycomb structure adjacent the leading edge of the blade has a higher density than the portion adjacent the trailing edge of the blade.

The honeycomb structure may be bonded to one of the wall members and then machined, the other wall member then being bonded both to the honeycomb structure and to the said one wall member.

The leading edge of the blade may be coated with a coating of polyurethane to protect and reinforce the joint at the leading edge between the said wall members. The said coating may have a wire gauze embedded therein.

The joint between the said wall members at the leading edge portion of the blade may be displaced from the leading edge proper.

The invention also comprises an aerofoil-shaped blade for a fluid flow machine, e.g. a compressor rotor blade of a gas turbine engine, when made by the method set forth above.

The invention is illustrated, merely by way of example, in the accompanying drawings, in which:

FIG. 1 is a view, partly in section, of a gas turbine engine according to the present invention, FIG. 2 is a sectional plan view of one of the blades of said engine, and FIG. 3 is a section taken on the line 3—3 of FIG. 2.

In FIG. 1 there is shown a gas turbine engine 10 having an engine casing 11 within which there are mounted in flow series a compressor 12, combustion equipment 13, and a turbine 14.

The compressor 12 has rotor blades 15, each of which is formed of two wall members 16, 17 (FIGS. 2 and 3) with a honeycomb structure 18 disposed therebetween.

The wall members 16, 17 are initially produced from titanium sheet or plate or from titanium alloy forgings which have been hot pressed to give them the desired camber and stagger.

The wall members 16, 17 are respectively electron beam welded to parts 20, 21 of a root portion 22 of the blade 15, after which these parts are inspected and dressed. The root portion 22 may either have a straight centre line, as shown, or one which is curved so that the surface of the root portion is carried to follow the blade profile. In the latter case, it is not necessary to provide transition pieces between the root portion and the blade proper, and may be provided with a shroud portion formed separately therefrom.

The root portions 20, 21 and the wall members 16, 17 which have been welded thereto are then etched and electro-chemically machined at surfaces such as the surface 23 which are thereafter to be bonded to each other.

As shown in FIG. 2, the honeycomb structure may be in two portions 26, 27 which are respectively disposed adjacent the leading edge 24 and the trailing edge 25. The portions 26, 27 are spaced by an axial gap 28 which may, however, be omitted so that the portions 26, 27 contact, but are separate from each other. The portion 26 is of relatively heavy gauge material and/or has cells of relatively small size, while the portion 27 is of relatively thin gauge material and/or has cells of relatively large size. Thus, the density of the portion 26 adjacent the leading edge 24 is higher than that of the portion 27 adjacent the trailing edge 25.

Alternatively, the honeycomb structure could be a single integral structure having portions of different densities, e.g., by being stretched in a non-uniform manner. Thus, the density could vary progressively from the leading to the trailing edge of the blade.

The arrangement illustrated in FIG. 3 enables the center of gravity of the blade to be moved towards the mid-chord position and this in turn enables the wall members 16, 17 to be made symmetrical about the mean line. The blade may, moreover, thereby be made stronger when heavy ingestion loads are applied.

The honeycomb structure 18, which may be formed of aluminium or an aluminium alloy, is then bonded to one of the wall members e.g. to the wall member 17.

Th honeycomb structure 18 is then machine to a form such that the wall member 16 can be bonded both to the honeycomb structure 18 and to the blade wall member 17. Such bonding is then effected at the root portion 22, at the leading edge 24, and at the trailing edge 25.

The bonding agent which may be employed for all the said bonding steps may be a polyurethane resin or may be bonding agents marketed under the names "Eccobond 34," "Hidux Film Adhesive," "NML 35" or "BSL 308."

Alternatively, the honeycomb structure could also be made of titanium or a titanium alloy, or could be made of glass or other fibre-reinforced synthetic resin material.

The leading edge 24 of each blade 15 is finally coated with a coating of a polyurethane resin (e.g. that sold under the trademark "Adiprene"), in order to protect and reinforce the joint at the leading edge 24 between the wall members 16, 17. This coating (not shown) may moreover be reinforced by titanium wire gauze (not shown) being embedded therein. The said joint, moreover, may be somewhat displaced from the leading edge proper so as to be disposed on the convex side of the blade. This reduces the risk that a foreign body will strike the joint and force it open.

If desired, the wall members 16, 17 may alternatively be bonded together by radial strips of glass fibre.

As will be seen from FIG. 2, the portions of the wall members 16, 17 adjacent the leading edge 24 are thicker than the main portions thereof so as to improve the resistance of the blades 15 to hard foreign objects and also to move the centre of gravity of the blades forwards of the mid-chord position.

The blades 15 described above are relatively simple to manufacture and have considerable stiffness while providing vibration damping.

We claim:

1. A method of making an aerofoil-shaped blade having improved weight distribution characteristics for a fluid flow machine comprising the steps of forming the blade of two separate wall members, forming a multicellular honeycomb structure with different portions having different densities, and bonding said wall members to each other and to a multicellular honeycomb structure disposed between the wall members.

2. A method as claimed in claim 1 in which the honeycomb structure and wall members are made of metal or alloy.

3. A method as claimed in claim 2 in which the honeycomb structure is made of a different metal or alloy from that of the wall members.

4. A method as claimed in claim 1 in which the honeycomb structure is made of fibre-reinforced synthetic resin material.

5. A method as claimed in claim 1 in which the said wall members are sheet metal.

6. A method as claimed in claim 1 in which each wall member is bonded to a part of the root portion of the blade, and the said parts of the root portion are thereafter bonded to each other.

7. A method as claimed in claim 6 in which the surface of the said root portion is curved to follow the blade profile.

8. A method as claimed in claim 6 in which, prior to the parts of the said root portion being bonded to each other, the said parts and the wall members bonded thereto are etched and electro-chemically machined at the surfaces which are to be bonded.

9. A method as claimed in claim 1 in which the said portions of the honeycomb structure are portions of a single integral structure.

10. A method as claimed in claim 1 in which the portions of the honeycomb structure have been stretched in a non-uniform manner.

11. A method as claimed in claim 1 in which the said portions of the honeycomb structure are separate from each other.

12. A method as claimed in claim 11 in which the separate portions of the honeycomb structure are of different gauge material.

13. A method as claimed in claim 1 in which the portion of the honeycomb structure adjacent the leading edge of the blade has a higher density than the portion adjacent the trailing edge of the blade.

14. A method as claimed in claim 1 in which the honeycomb structure is bonded to one of the wall members and is then machined, the other wall member then being bonded both to the honeycomb structure and to the said one wall member.

15. A method as claimed in claim 1 in which the portion of the blade adjacent the leading edge is coated with a coating of polyurethane to protect and reinforce the joint adjacent the leading edge between the said wall members.

16. A method as claimed in claim 15 in which the said coating has wire gauze embedded therein.

17. A method as claimed in claim 1 in which the joint between the said wall members at the leading edge portion of the blade is displaced from the leading edge proper.

18. A method as claimed in claim 1 in which the said wall members are forgings which have been hot pressed to give them the desired camber and stagger.

19. A method as claimed in claim 12 in which the separate portions of the honeycomb have different cell size.

References Cited

UNITED STATES PATENTS

| | | | |
|---|---|---|---|
| 2,720,948 | 10/1955 | Pajak. | |
| 3,055,437 | 9/1962 | Stack | 416—144X |
| 3,196,533 | 7/1965 | Ida et al. | 29—455X |
| 3,323,597 | 6/1967 | Longobardi et al. | 416—144 |
| 3,002,567 | 10/1961 | Stulen et al. | 29—156.8X |
| 2,807,437 | 9/1957 | Roush | 29—156.8X |
| 2,817,490 | 12/1957 | Broffitt | 29—156.8X |
| 3,097,982 | 7/1963 | Stoner | 29—156.8X |
| 3,135,486 | 6/1964 | Wing | 29—156.8X |
| 3,166,295 | 1/1965 | Szewalski | 29—156.8X |

JOHN F. CAMPBELL, Primary Examiner

D. C. REILEY, Assistant Examiner

U.S. Cl. X.R.

29—455; 416—144, 233